US011921217B2

(12) United States Patent
Kerstein

(10) Patent No.: US 11,921,217 B2
(45) Date of Patent: Mar. 5, 2024

(54) METHOD AND DEVICE FOR THE DYNAMIC EXTENSION OF A TIME-OF-FLIGHT CAMERA SYSTEM

(71) Applicants: IFM Electronic GmbH, Essen (DE); PMDTechnologies AG, Siegen (DE)

(72) Inventor: Thomas Kerstein, Kreuztal (DE)

(73) Assignees: IFM Electronic GmbH, Essen (DE); PMDTechnologies AG, Siegen (DE)

( * ) Notice: Subject to any disclaimer, the term of this patent is extended or adjusted under 35 U.S.C. 154(b) by 0 days.

(21) Appl. No.: 18/025,241

(22) PCT Filed: Aug. 25, 2021

(86) PCT No.: PCT/EP2021/073456
§ 371 (c)(1),
(2) Date: Mar. 8, 2023

(87) PCT Pub. No.: WO2022/053313
PCT Pub. Date: Mar. 17, 2022

(65) Prior Publication Data
US 2023/0243974 A1    Aug. 3, 2023

(30) Foreign Application Priority Data

Sep. 10, 2020    (DE) ..................... 102020123671.9

(51) Int. Cl.
*G01C 3/08*    (2006.01)
*G01S 17/894*    (2020.01)

(52) U.S. Cl.
CPC .................. *G01S 17/894* (2020.01)

(58) Field of Classification Search
CPC ....... G01S 17/894; G01S 17/86; G06T 7/521; G06T 2207/20212; H04B 10/697
See application file for complete search history.

(56) References Cited

U.S. PATENT DOCUMENTS

| 2012/0050557 A1 | 3/2012 | Atanassov et al. |
| 2020/0072946 A1 | 3/2020 | Fisher et al. |
| 2022/0247908 A1* | 8/2022 | Wang ................... G02B 21/361 |

FOREIGN PATENT DOCUMENTS

| DE | 10 2018 107 801 A1 | 10/2018 |
| WO | WO 2014/177750 A1 | 11/2014 |

OTHER PUBLICATIONS

Granados et al., Optimal HDR Reconstruction with Linear Digital Cameras, IEEE Computer Society Conference on Computer Vision and Pattern Recognition, 2010, S.215-222.

* cited by examiner

*Primary Examiner* — Samantha K Nickerson
(74) *Attorney, Agent, or Firm* — Patent Technologies, LLC; Robert D. Gunderman, Jr.

(57) ABSTRACT

The invention relates to a method for the dynamic extension of raw phase images of a time-of-flight camera or time-of-flight camera system, in which method at least two depth images are taken using different exposure times.

4 Claims, 2 Drawing Sheets

METHOD AND DEVICE FOR THE DYNAMIC EXTENSION OF A TIME-OF-FLIGHT CAMERA SYSTEM

Figure 1:
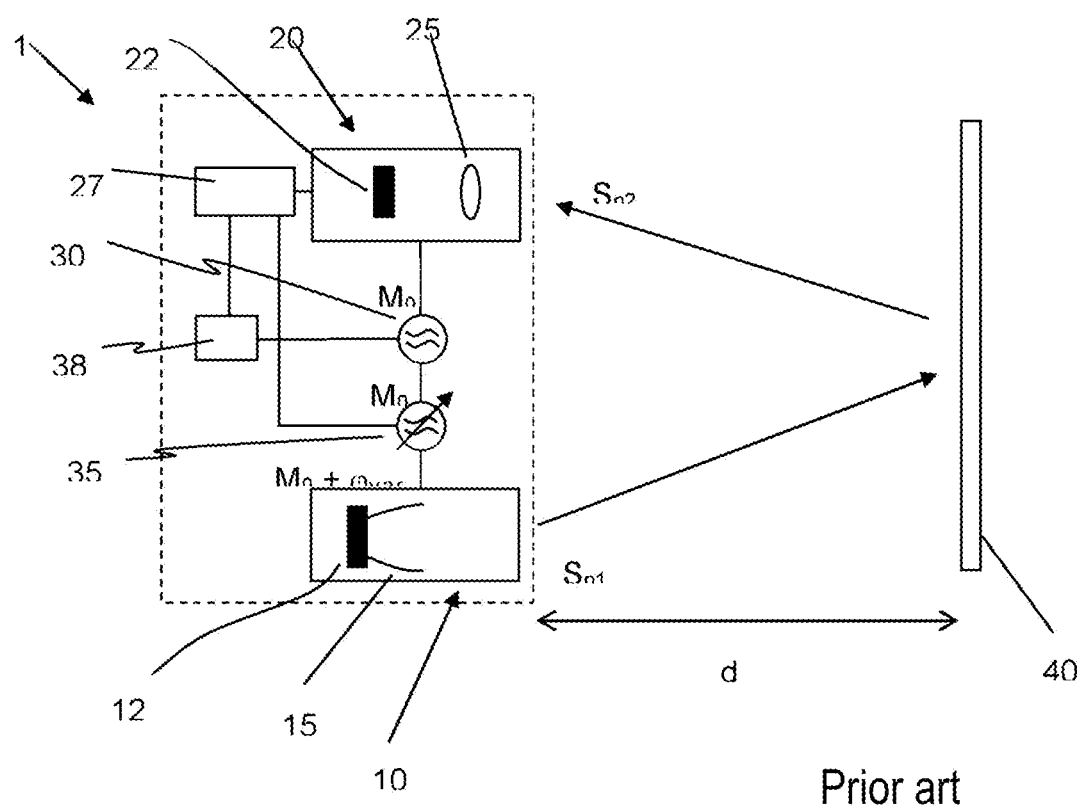

The invention relates to a method in which a plurality of raw data measurements with different exposure times are combined with each other in order to thus synthetically extend the dynamic range of the image sensor and to prevent in this way saturation effects as much as possible.

The term time-of-flight camera or time-of-flight camera system is intended here to cover, in particular, systems that obtain distances from a phase shift of emitted and received radiation. In particular, PMD cameras comprising photo-mixing detectors (PMD), such as those described in DE 197 04 496 A1, are suitable as time-of-flight or TOF cameras.

From DE 197 04 496 A1, moreover, the determination of a distance or a corresponding phase shift of the light reflected from an object is known. In particular, it is disclosed to selectively shift the transmitter modulation by 90°, 180° or 270° in order to determine from these four phase measurements or four phase images a phase shift and thus a distance via an arctan function.

It is the object of the invention to improve the dynamic range of a time-of-flight camera.

Advantageously, a method for dynamic range extension of raw phase images (M) of a time-of-flight camera system is provided, in which the time-of-flight camera system determines distances (d) from a phase shift ($\Delta\varphi$) of emitted and received radiation, wherein for the distance determination a plurality of raw phase images (M) are acquired at different phase positions ($\varphi_{var}$) (between illumination and receiver and are captured with different exposure times ($t_{exp1}$, $t_{exp2}$), comprising the steps of:

a) identifying non-valid, i.e. saturated, pixels, and valid, i.e. non-saturated, pixels in the raw phase images (M), b) calculating normalized raw phase images ($\hat{M}$) by subtracting a fixed pixel offset (Fixed Pattern Noise (FPN)) from each raw phase image (M) and normalizing the image reduced by the fixed pixel offset (FPN) with the respective exposure time ($t_{exp1}$, $t_{exp2}$) according to $$\frac{M(t_{exp}) - FPN}{t_{exp}}$$

c) calculating weighted and normalized raw phase images ($\hat{M}'$) by multiplying the normalized raw phase images ($\hat{M}$) with a respective weighting matrix (G) according to $$\hat{M}'(t_{exp}) = \hat{M}(t_{exp}) * G_{t_{exp}}$$

d) calculating a weighted and normalized HDR image for a respective phase position by adding the weighted normalized raw phase images of the respective phase position and normalizing to the sum of the weighting matrices, according to $$\hat{M}_{HDR} = [\hat{M}'(t_{exp1}) + \hat{M}'(t_{exp2})] \circ \left(\frac{1}{G_{t_{exp1}} + G_{t_{exp2}}}\right),$$

wherein the operator "∘" shall represents an element-wise multiplication, like e.g. the so-called Hadamard operator, e) calculating a HDR raw phase image ($M_{HDR}$) by multiplying the weighted and normalized HDR raw phase image ($\hat{M}_{HDR}$) by one of the exposure times ($t_{exp1}$, $t_{exp2}$) and adding the fixed pixel offset, according to $$M_{HDR} = \hat{M}_{HDR} \cdot t_{exp1} + FPN$$

f) providing the HDR raw phase image ($M_{HDR}$) for a subsequent processing.

This approach has the advantage that the HDR raw phase image ($M_{HDR}$) is available for further processing, which does not differ from conventional processing. Thus, HDR processing can be considered and carried out as a completely independent pre-processing step.

Furthermore, it is advantageous if in step e) the weighted and normalized HDR raw phase image ($\hat{M}_{HDR}$) is multiplied by the longest exposure time ($t_{exp1}$, $t_{exp2}$).

It is preferred that the values of the weighting matrix (G) in step c) for each unsaturated pixel correspond to the respective underlying exposure time ($t_{exp1}$, $t_{exp2}$) and for saturated pixels these pixels are set to the value zero in the weighting matrix G.

In the following, the invention is explained in more detail by means of exemplary embodiments with reference to the drawings.

The figures schematically show:

FIG. 1 a time-of-flight camera system; and

Figure 2:
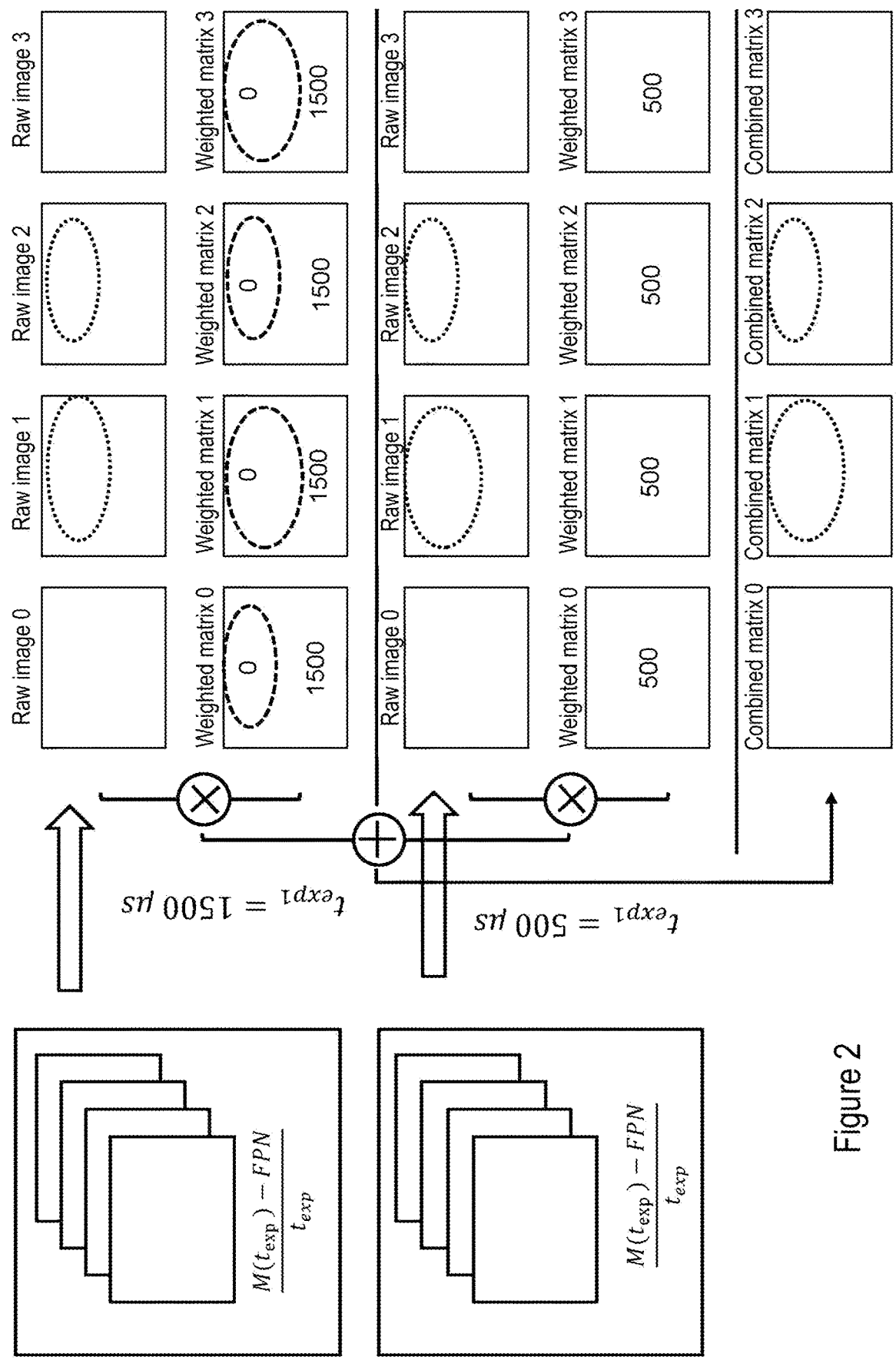

FIG. 2 an HDR weighting scheme.

FIG. 1 shows a measurement situation for an optical distance measurement by use of a time-of-flight camera, as known for example from DE 197 04 496 A1.

The time-of-flight camera system 1 comprises a transmitter unit or an illumination module 10 comprising an illumination 12 and an associated beam forming optics 15 and a receiving unit or a time-of-flight camera 20 comprising a receiving optics 25 and a time-of-flight sensor 22.

The time-of-flight sensor 22 comprises at least one time-of-flight pixel, preferably also a pixel array and is designed in particular as a PMD sensor. The receiving optics 25 typically consists of a plurality of optical elements in order to improve the imaging properties. The beam forming optics 15 of the transmitter unit 10 can, for example, be designed as a reflector or lens optics. In a very simple configuration, it may also be possible to dispense with optical elements on both the receiving and transmitting sides.

The measuring principle of this arrangement is essentially based on the fact that, starting from the phase shift of the emitted and received light, the propagation time of and thus the distance traveled by the received light can be determined. For this purpose, the light source 12 and the time-of-flight sensor 22 are jointly supplied with a certain modulation signal Mo having a base phase position $\varphi_0$ via a modulator 30. In the example shown, a phase shifter 35 is further provided between the modulator 30 and the light source 12, by means of which the base phase $\varphi_0$ of the modulation signal Mo of the light source 12 can be shifted by defined phase positions. For typical phase measurements, phase positions of $\varphi_{var}=0°$, 90°, 180° and 270° are preferably used.

According to the set modulation signal, the light source 12 emits an intensity modulated signal $S_{p1}$ with the first phase position p1 or p1=$\varphi_0+\varphi_{var}$. In the case shown, this signal $S_{p1}$ or the electromagnetic radiation is reflected by an object 40 and, due to the distance traveled, hits the object 40 with a corresponding phase shift $\Delta\varphi(t_L)$ with a second phase position p2=$\varphi_0+\varphi_{var}+\Delta\varphi(t_L)$ as a received signal $S_{p2}$ on the time-of-flight sensor 22. In the time-of-flight sensor 22, the modulated signal Mo is mixed with the received signal $S_{p2}$, and the phase shift or the object distance d is determined from the resulting signal.

Furthermore, the system comprises a modulation controller 27 which, depending on the actual measurement task changes the phase position $\varphi_{var}$ of the modulation signal Mo and/or adjusts the modulation frequency via a frequency oscillator 38.

Preferably, as illumination source or light source 12 infrared light emitting diodes are suited. Of course, other radiation sources in other frequency ranges are conceivable, in particular light sources in the visible frequency range come into consideration.

High dynamic range imaging is already well established in the 2D domain. In the case of 3D-ToF measurements, however, such a mode is all the more important, since this is an active measurement method, by means of which large intensity differences can occur. Thus, saturation effects often occur in the near range, while high distance noise is preferentially encountered in the far range due to low signal strength of the reflected light.

In the method described here, a plurality of raw data measurements taken with at least two different exposure times are combined with each other, weighted according to their exposure time, so that the entire information content of all pixels is utilized apart from saturated pixels.

Another key point of the invention is that the HDR calculation can be carried out as a completely independent pre-processing step and the subsequent processing of the measurement data can be carried out unchanged and completely independent of this HDR calculation.

For the determination of distances according to the phase measurement principle, phase differences/shifts $\Delta\varphi=m$ between the emitted and the received modulation signal are first detected at different phase positions $\varphi_{var}$ between transmitter and receiver. These phase shifts $m_{ij}$ are detected for each pixel ij of a time-of-flight light sensor and form a raw phase image M. For the calculation of the actual phase shift $\Delta\varphi(t_L)$ at least two, preferably three or four, possibly also more raw phase images M are acquired at different phase positions $\varphi_{var}$.

Based on the raw phase images M, distances d or depth images D can then be calculated taking into account the known modulation frequency and the arctan relationship.

According to the invention, it is now intended to capture the raw phase images M with at least two different exposure times $t_{exp1}$ and $t_{exp1}$. For example, with four different phase positions War and two exposure times, eight raw phase images M are then available.

For further processing, the saturated pixels in all raw phase images M are identified, for example, by use of saturation thresholds.

In order to be able to combine the measurements of both exposure times, these must then be normalized to the respective exposure times after subtracting the so-called Fixed Pattern Noise (FPN):

$$\hat{M} = \frac{M(t_{exp}) - FPN}{t_{exp}}$$

For each of these normalized raw phase images $\hat{M}$, an additional weighting matrix G of corresponding size is now created. The values of this weighting matrix G correspond to the respective underlying exposure time $t_{exp1}$ or $t_{exp2}$ for each unsaturated pixel.

For saturated pixels, on the other hand, the respective entry in the weighting matrix G always assumes the value zero. In this case, the saturated pixels of each individual raw phase image M can be considered individually and thus be stored as zero weights in the corresponding weighting matrix G. Alternatively, however, an OR operation can be performed on the saturated pixels across all four raw phase images of an exposure time, so that the weighting matrices G of all four raw phase images M of an exposure time are respectively identical.

Let it be assumed in the following example for simplicity that a scene has been captured by use of a sensor with a resolution of 2×2 pixels with two different exposure times $t_{exp1}$ and $t_{exp2}$, wherein: $t_{exp1}=2t_{exp2}$. In principle, of course, the exposure times can have any other relationship.

Furthermore, in this example it is assumed that the top two pixels were classified as saturated for the longer of the two exposure times. For each exposure time, a respective weighting matrix G is created. All pixels are then multiplied by this matrix, wherein the saturated pixels are disregarded by a weight of zero and only the non-saturated pixels contribute to a measured value.

The present example is to be based on the following normalized raw phase images:

$$\hat{M}(t_{exp1}) = \begin{pmatrix} 29 & 30 \\ 24 & 9 \end{pmatrix}; \hat{M}(t_{exp2}) = \begin{pmatrix} 35 & 40 \\ 21 & 12 \end{pmatrix}$$

The saturated pixels have now already been identified and classified with weight zero in the corresponding weighting matrix. By multiplying the normalized raw phase images with the weighting matrices $G_{t_{exp1}}$ and $G_{t_{exp2}}$ the matrices $\hat{M}'$ are then calculated as intermediate results as follows:

$$\hat{M}'(t_{exp1}) = \hat{M}(t_{exp1}) * G_{t_{exp1}}$$

$$\hat{M}(t_{exp1}) = \begin{pmatrix} 29 & 30 \\ 24 & 9 \end{pmatrix} * \begin{pmatrix} 0 & 0 \\ 1 & 1 \end{pmatrix} * t_{exp1} = \begin{pmatrix} 0 & 0 \\ 24t_{exp1} & 9t_{exp1} \end{pmatrix}$$

For the second exposure time the calculation is analogous:

$$\hat{M}'(t_{exp2}) = \hat{M}(t_{exp2}) * G_{t_{exp2}}$$

$$\hat{M}'(t_{exp2}) = \begin{pmatrix} 35 & 40 \\ 21 & 12 \end{pmatrix} * \begin{pmatrix} 1 & 1 \\ 1 & 1 \end{pmatrix} * t_{exp2} = \begin{pmatrix} 35t_{exp2} & 40t_{exp2} \\ 21t_{exp2} & 12t_{exp2} \end{pmatrix}$$

This calculation of the weighting matrices as well as the subsequent multiplication is now carried out in the same way individually for each raw phase image.

The normalized raw phase images M' weighted according to the corresponding weighting matrices G are then added and again normalized to the sum of the weighting matrices.

The operator "∘" here represents an operator of element-wise multiplication, known for example as the Hadamard operator.

$$\hat{M}_{HDR} = [\hat{M}'(t_{exp1}) + \hat{M}'(t_{exp2})] \circ \left( \frac{1}{G_{t_{exp1}} + G_{t_{exp2}}} \right)$$

$$\hat{M}_{HDR} = \left[ \begin{pmatrix} 0 & 0 \\ 24t_{exp1} & 9t_{exp1} \end{pmatrix} + \begin{pmatrix} 35t_{exp2} & 40t_{exp2} \\ 21t_{exp2} & 12t_{exp2} \end{pmatrix} \right] \circ$$

$$\begin{pmatrix} \frac{1}{t_{exp2}} & \frac{1}{t_{exp2}} \\ \frac{1}{t_{exp1} + t_{exp2}} & \frac{1}{t_{exp1} + t_{exp2}} \end{pmatrix} = \begin{pmatrix} 35 & 40 \\ \frac{24t_{exp1} + 21t_{exp2}}{t_{exp1} + t_{exp2}} & \frac{9t_{exp1} + 21t_{exp2}}{t_{exp1} + t_{exp2}} \end{pmatrix}$$

Under the assumption $t_{exp1}=2t_{exp2}$ this can be simplified to:

$$\hat{M}_{HDR} = \left[\begin{pmatrix} 0 & 0 \\ 48t_{exp1} & 18t_{exp2} \end{pmatrix} + \begin{pmatrix} 35t_{exp2} & 40t_{exp2} \\ 21t_{exp2} & 12t_{exp2} \end{pmatrix}\right] \circ \begin{pmatrix} \frac{1}{t_{exp2}} & \frac{1}{t_{exp2}} \\ \frac{1}{3t_{exp2}} & \frac{1}{3t_{exp2}} \end{pmatrix} =$$

$$\begin{pmatrix} 35 & 40 \\ 23 & 10 \end{pmatrix}$$

By multiplying by the longest exposure time, the original resolution is preserved. If, on the other hand, the multiplication were carried out with the shorter exposure time, this would result in a reduction of the resolution, but would also be possible in principle if required. In particular, in the case of more than two exposure times, a particularly favorable exposure time for further processing could be selected. As a rule, however, the longest exposure time would be preferred.

The entire pixel information from all captured raw phase images M is thus utilized in an optimal manner. Finally, the combined HDR raw phase images are multiplied by the longest exposure time $t_{exp1}$ and FPN is added to convert them into the output version.

$$M_{HDR}=\hat{M}_{HDR} \cdot t_{exp1}+FPN$$

Consequently, the conventional processing can then be applied in an unmodified manner to the combined, synthetically generated raw phase images $M_{HDR}$. The HDR processing extends the original range of values so that negative pixel values may occur after combination.

FIG. 2 schematically shows an HDR weighting scheme for four captured raw phase images each with two exemplary exposure times $t_{exp1}=1500$ µs and $t_{exp2}=500$ µs.

The procedure basically serves to generate a data set consisting of synthetic raw phase images which have the same structure as the original raw phase images and by means of which therefor a calculation can be carried out in an identical way as for the original raw phase images.

Thus it makes no difference for the data processing whether it is about real raw phase images or the synthetically generated HDR raw phase images and the processing can be considered as a completely autonomous and independent pre-processing step.

The invention claimed is:

1. A method for dynamic extension of raw phase images (M) of a time-of-flight camera system, in which the time-of-flight camera system determines distances (d) from a phase shift (Δφ) of emitted and received radiation, wherein for the distance determination a plurality of raw phase images (M) are acquired at different phase positions ($\varphi_{var}$) between illumination and receiver and are captured with different exposure times ($t_{exp1}$, $t_{exp2}$), comprising the steps of:
   a) identifying non-valid, i.e. saturated, pixels and valid, i.e. non-saturated, pixels in the raw phase images (M),
   b) calculating normalized raw phase images ($\hat{M}$) by subtracting a fixed pixel offset (Fixed Pattern Noise (FPN)) from each raw phase image (M) and normalizing the image reduced by the fixed pixel offset (FPN) with the respective exposure time ($t_{exp1}$, $t_{exp2}$) according to $$\frac{M(t_{exp}) - FPN}{t_{exp}}$$

c) calculating weighted and normalized raw phase images ($\hat{M}'$) by multiplying the normalized raw phase images ($\hat{M}$) with a respective weighting matrix (G) according to $$\hat{M}'(t_{exp})=\hat{M}(t_{exp})*G_{t_{exp}},$$

d) calculating a weighted and normalized high dynamic range (HDR) raw phase image ($\hat{M}_{HDR}$) for a respective phase position by adding the weighted normalized raw phase images $\hat{M}'$ of the respective phase position and normalizing to the sum of the weighting matrices, according to $$\hat{M}_{HDR} = [\hat{M}'(t_{exp1}) + \hat{M}'(t_{exp2})] \circ \left(\frac{1}{G_{t_{exp1}} + G_{t_{exp2}}}\right)$$

e) calculating a high dynamic range (HDR) raw phase image ($M_{HDR}$) by multiplying the weighted and normalized high dynamic range (HDR) raw phase image ($\hat{M}_{HDR}$) by one of the exposure times ($t_{exp1}$, $t_{exp2}$) and adding the fixed pixel offset, according to $$M_{HDR}=\hat{M}_{HDR} \cdot t_{exp1}+FPN, \text{ and}$$

f) providing the high dynamic range (HDR) raw phase image ($M_{HDR}$) for a subsequent processing.

2. The method of claim 1, wherein in step e) the weighted and normalized high dynamic range (HDR) raw phase image (MHDR) is multiplied by the longest exposure time a ($t_{exp1}$, $t_{exp2}$).

3. The method according to claim 1, wherein the values of the weighting matrix (G) in step c) correspond for each unsaturated pixel the respective underlying exposure time ($t_{exp1}$, $t_{exp2}$) and for saturated pixels these pixels assume the value zero in the weighting matrix G.

4. A time-of-flight camera system configured to carry out a method for dynamic extension of raw phase images (M) of the time-of-flight camera system, in which the time-of-flight camera system determines distances (d) from a phase shift (Δφ) of emitted and received radiation,
   wherein for the distance determination a plurality of raw phase images (M) are acquired at different phase positions ($\varphi_{var}$) (between illumination and receiver and are captured with different exposure times ($t_{exp1}$, $t_{exp2}$), comprising the steps of:
   a) identifying non-valid, i.e. saturated, pixels and valid, i.e. non-saturated, pixels in the raw phase images (M),
   b) calculating normalized raw phase images ($\hat{M}$) by subtracting a fixed pixel offset (Fixed Pattern Noise (FPN)) from each raw phase image (M) and normalizing the image reduced by the fixed pixel offset (FPN) with the respective exposure time ($t_{exp1}$, $t_{exp2}$) according to $$\frac{M(t_{exp}) - FPN}{t_{exp}}$$

c) calculating weighted and normalized raw phase images ($\hat{M}'$) by multiplying the normalized raw phase images ($\hat{M}$) with a respective weighting matrix (G) according to $$\hat{M}'(t_{exp})=\hat{M}(t_{exp})*G_{t_{exp}},$$

d) calculating a weighted and normalized high dynamic range (HDR) raw phase image ($\hat{M}_{HDR}$) for a respective phase position by adding the weighted normalized raw phase images $\hat{M}'$ of the respective phase position and normalizing to the sum of the weighting matrices, according to $$\hat{M}_{HDR} = \left[\hat{M}'(t_{exp1}) + \hat{M}'(t_{exp2})\right] \circ \left(\frac{1}{G_{t_{exp1}} + g_{t_{exp2}}}\right),$$

e) calculating a high dynamic range (HDR) raw phase image ($M_{HDR}$) by multiplying the weighted and normalized high dynamic range (HDR) raw phase image ($\hat{M}_{HDR}$) by one of the exposure times ($t_{exp1}$, $t_{exp2}$) and adding the fixed pixel offset, according to $M_{HDR} = \hat{M}_{HDR} \cdot t_{exp1} + FPN$, and f) providing the high dynamic range (HDR) raw phase image ($M_{HDR}$) for a subsequent processing.

\* \* \* \* \*